US012602350B2

(12) United States Patent
Dastidar et al.

(10) Patent No.: US 12,602,350 B2
(45) Date of Patent: Apr. 14, 2026

(54) HOST ENDPOINT ADAPTIVE COMPUTE COMPOSABILITY

(71) Applicant: XILINX, INC., San Jose, CA (US)

(72) Inventors: Jaideep Dastidar, San Jose, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 839 days.

(21) Appl. No.: 17/892,955

(22) Filed: Aug. 22, 2022

(65) Prior Publication Data
US 2024/0061805 A1     Feb. 22, 2024

(51) Int. Cl.
*G06F 9/50* (2006.01)
*G06F 15/78* (2006.01)

(52) U.S. Cl.
CPC ................................ *G06F 15/7896* (2013.01)

(58) Field of Classification Search
CPC ........ G06F 9/50; G06F 9/5005; G06F 9/5011; G06F 9/5022; G06F 9/5027; G06F 9/5044; G06F 9/5066
See application file for complete search history.

(56) References Cited

U.S. PATENT DOCUMENTS 10,673,439 B1    6/2020  Ahmad et al.
10,698,842 B1    6/2020  Dastidar et al.

11,063,594 B1    7/2021  Ahmad et al.
11,100,028 B1    8/2021  Subramaniam et al.
2020/0136906 A1*  4/2020  Guim Bernat ........ H04L 9/3213
2023/0305993 A1*  9/2023  Davis ........................ G06F 1/28

OTHER PUBLICATIONS

International Search Report and Written Opinion from PCT/US2023/019312 dated Aug. 11, 2023.
Office Action from Europe Application No. 23724987.5 dated Nov. 6, 2025.

* cited by examiner

*Primary Examiner* — Andy Ho
(74) *Attorney, Agent, or Firm* — Patterson + Sheridan, LLP

(57)        ABSTRACT

Embodiments herein describe a processor system that includes an integrated, adaptive accelerator. In one embodiment, the processor system includes multiple core complex chiplets that each contain one or processing cores for a host CPU. In addition the processor system includes an accelerator chiplet. The processor system can assign one or more of the core complex chiplets to the accelerator chiplet to form an IO device while the remaining core complex chiplets form the CPU for the host. In this manner, rather than the accelerator and the CPU having independent computer resources, the accelerator can be integrated into the processor system of the host so that hardware resources can be divided between the CPU and the accelerator depending on the needs of the particular application(s) executed by the host.

20 Claims, 6 Drawing Sheets

DETERMINE WORKLOADS OF THE CPU AND THE ACCELERATOR          205

SELECT AT LEAST ONE OF THE CORE COMPLEX CHIPLETS TO ASSIGN TO THE I/O DEVICE          210

REMOVE THE SELECTED CORE COMPLEX AS A PEER OF THE REMAINING CORE COMPLEX CHIPLETS          215

ADD THE SELECTED CORE COMPLEX TO THE I/O DEVICE          220

225

NO

WORKLOAD CHANGE?

YES

ADJUST THE NUMBER OF CORE COMPLEX CHIPLETS ASSIGNED TO THE I/O DEVICE          230

HOST ENDPOINT ADAPTIVE COMPUTE COMPOSABILITY

TECHNICAL FIELD

Examples of the present disclosure generally relate to a processor system that includes processing chiplets that can be assigned to a central processing unit (CPU) of a host or to an accelerator chiplet to form an integrated IO device.

BACKGROUND

Current acceleration devices (e.g., input/output (IO) devices) such as Data Processing Units (DPUs) include different components such as I/O gateways, processor subsystems, network on chips (NoCs), storage and data accelerators, data processing engines, and programmable logic (PL). Currently, the DPU is connected to a processor complex of a host using a PCIe connection. The host processing capabilities and DPU's embedded processing capabilities are dimensioned independently. For some workloads, the DPU may have much more compute processing than is required to perform its tasks, thereby wasting power and space in the computing system. For other workloads, the DPU may not have enough compute processing required to perform its tasks, and becomes a bottleneck.

SUMMARY

One embodiment describes a computing system that includes a processor system in a host that includes a substrate, a plurality of core complex chiplets each comprising at least one processor core, an accelerator chiplet, and a composable agent configured to assign at least one of the plurality of core complex chiplets to the accelerator chiplet to form an IO device while the remaining plurality of core complex chiplets form a central processing unit (CPU) for the host.

Another embodiment described herein is an processor system that includes a plurality of core complex chiplets each comprising at least one processor core, an accelerator chiplet, and an interconnect connecting the plurality of core complex chiplets to each other and to the accelerator chiplet. The interconnect includes a composable agent configured to assign at least one of the plurality of core complex chiplets to the accelerator chiplet to form an IO device while the remaining plurality of core complex chiplets form a central processing unit (CPU) for a host.

Another embodiment described herein is a method that includes selecting at least one of a plurality of core complex chiplets to assign to an IO device while the remaining ones of the plurality of core complex chiplets are assigned to a CPU of a host, removing the selected core complex chiplet as a peer of the remaining ones of the plurality of core complex chiplets, and add the selected core complex chiplet to the IO device, wherein the plurality of core complex chiplets are disposed on a same substrate as an accelerator chiplet also assigned to the IO device.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
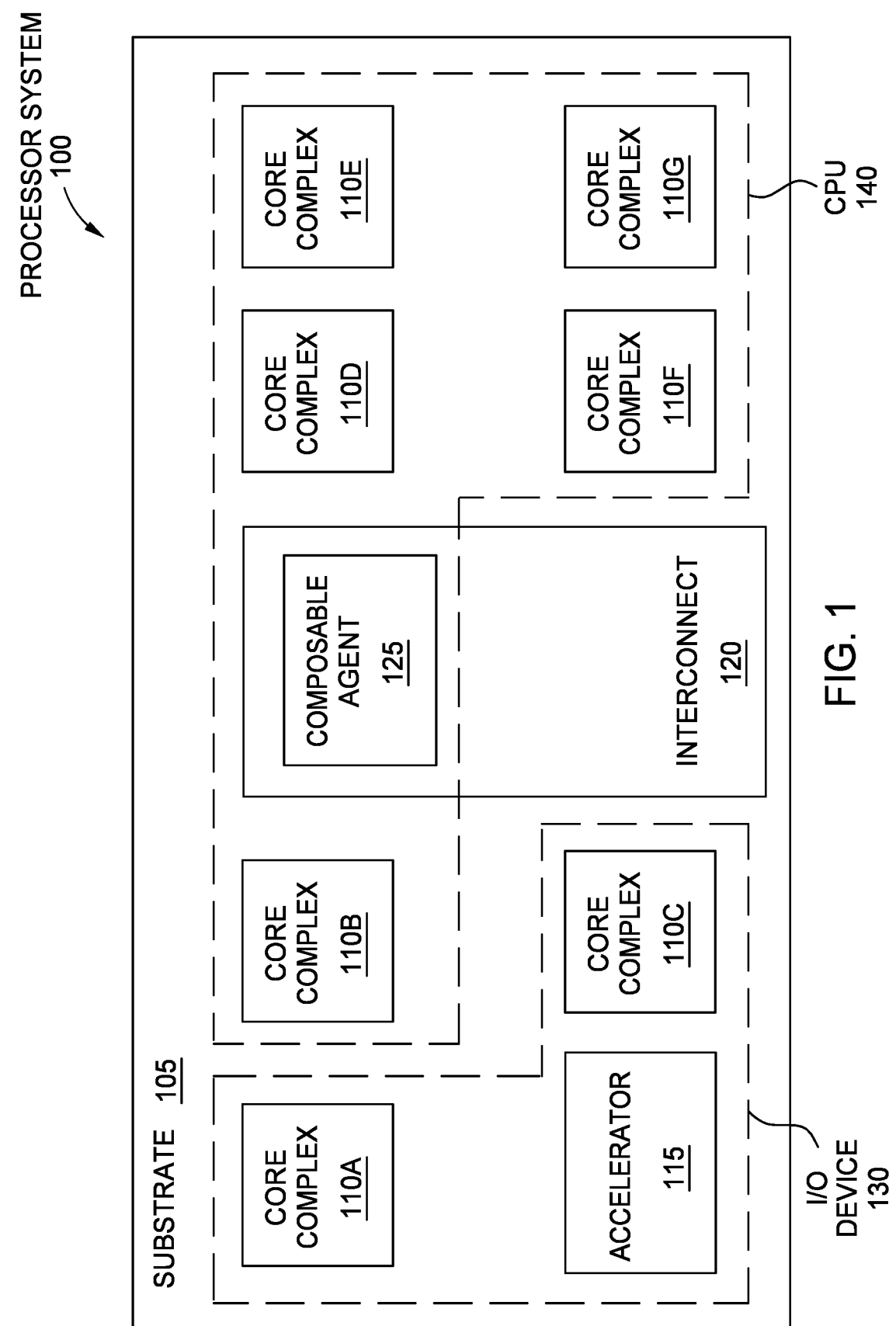
FIG. 1 illustrates a processor system that includes an integrated, adaptive accelerator, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a processor system that includes an integrated, adaptive accelerator. In one embodiment, the processor system includes multiple core complex chiplets that each contain one or processing cores for a host CPU. In addition, the processor system includes an accelerator chiplet (e.g., a SmartNIC, database accelerator, artificial intelligence (AI) accelerator, graphic processor unit (GPU), etc.). The processor system can assign one or more of the core complex chiplets to the accelerator chiplet to form an IO device while the remaining core complex chiplets form the CPU for the host. For example, the number of core complex chiplets assigned to the accelerator can be determined in response to whether the applications executed by the host will require more computer resources from the CPU or from the accelerator. For accelerator intensive applications, more core complex chiplets may be assigned to the accelerator and the IO device, while for CPU intensive applications, fewer (or none) of the core complex chiplets are assigned to the accelerator.

In this manner, rather than the accelerator and the CPU having independent compute resources, the accelerator can be integrated into the processor system of the host so that hardware resources can be divided between the CPU and the accelerator depending on the needs of the particular application(s) executed by the host.

FIG. 1 illustrates a processor system 100 that includes an integrated, adaptive accelerator, according to an embodiment. In this example, the processor system 100 includes a substrate 105 on which multiple core complex chiplets 110, an interconnect 120, and an accelerator chiplet 115 are disposed. In one embodiment, the core complex chiplets 110, the interconnect 120, and the accelerator chiplet 115 are individual integrated circuits (ICs). Each of the core complex chiplets 110 and the accelerator chiplet 115 can be connected to the interconnect 120 using traces in the substrate 105. That is, the interconnect 120 enables the core complex chiplets 110 to communicate with each other, as well as permitting the chiplets 110 to communicate with the accelerator chiplet 115. However, in other embodiments, the core complex chiplets 110 may also have direct connections to each other.

The interconnect 120 permits the core complex chiplets 110 to be assigned with other of the chiplets 110 to form a CPU 140 for the host, or be assigned to the accelerator chiplet 115 to form an IO device 130. That is, each core complex chiplet 110 can be assigned as a peer with the other chiplets 110 to form the CPU 140 or can be severed from the other chiplets 110 to be assigned to the IO device 130. When a core complex chiplet 110 is assigned to the IO device 130, the coherent connections between it and the other chiplets 110 are severed so it is no longer treated as a peer. Instead, the core complex chiplet 110 may no longer share the same memory space, or run the same operating system, as the other chiplets 110 in the CPU 140 and rely on a different interrupt semantics. This is discussed in more detail in FIG. 3.

In one embodiment, the core complex chiplets 110 are duplicate ICs—e.g., have the same number of processing cores and other hardware circuitry. However, the accelerator chiplet 115 may be different than the core complex chiplets 110. For example, the accelerator chiplet 115 may include specialized circuitry for performing an accelerator task such as a network interface (if the accelerator chiplet 115 is a DPU or a database accelerator), specialized data processing engines (e.g., for performing network or AI tasks), programmable logic for additional user configurability, a host interface for managing memory requests and interrupts with the interconnect 120, and the like. In one embodiment, the accelerator chiplet 115 does not include an embedded processor (e.g., a processor core). That is, in systems where the accelerator chiplet 115 and IO device 130 are not integrated into the processor system 100 of the host, these accelerators can include their own processor cores (e.g., general purpose processing units) as well as specialized accelerator engines. However, because the processing system 100 can assign one or more of the core complex chiplets 110 to the accelerator chiplet 115, the accelerator chiplet 115 no longer needs its own processor system, thereby saving space and power in the processor system 100. However, in other embodiments, it may be advantageous to still include a processor core in the accelerator chiplet 115.

The interconnect 120 includes a composable agent 125 that assigns the core complex chiplets 110 to the accelerator chiplet 115. In this embodiment, the agent 125 has assigned the core complex chiplets 110A and 110C to the accelerator chiplet 115 to form the IO device 130. In contrast, the composable agent 125 has assigned the core complex chiplets 110B and 110D-G to form the CPU 140. In one embodiment, the composable agent 125 makes this assignment when the computing system is booting.

In one embodiment, this assignment can be changed. For example, if the workload changes and the IO device 130 no longer needs as much compute resources to perform its acceleration tasks, the composable agent 125 can remove the core compute chiplet 110C from the IO device 130 and reassign it to the CPU 140. In this manner, each of the core complex chiplets 110 can either be assigned to the integrated IO device 130 or the CPU 140.

Further, having a separate interconnect 120 IC as shown is not necessary. In other embodiments, the functions performed by the interconnect 120 may be performed using hardware on the core complex chiplets 110 and the accelerator chiplet 115. The substrate 105 could include a network of interconnects for selectively connecting the core complex chiplets 110 and the accelerator chiplet 115. For example, portions of the Interconnect 120 can also be distributed across each core complex chiplet 110, with the substrate connections 105 achieving the multi-core-complex connectivity to create a CPU 140.

In another embodiment, the accelerator chiplet 115, or the circuitry in the chiplet, is part of the interconnect 120. That is, the accelerator chiplet 115 can be integrated into the same IC as the interconnect 120 rather than having separate ICs as shown in FIG. 1. Or stated oppositely, the interconnect 120 (which can include the composable agent 125 and the other circuitry shown in FIG. 1) can be part of the same IC as the accelerator chiplet 115.

Figure 2:
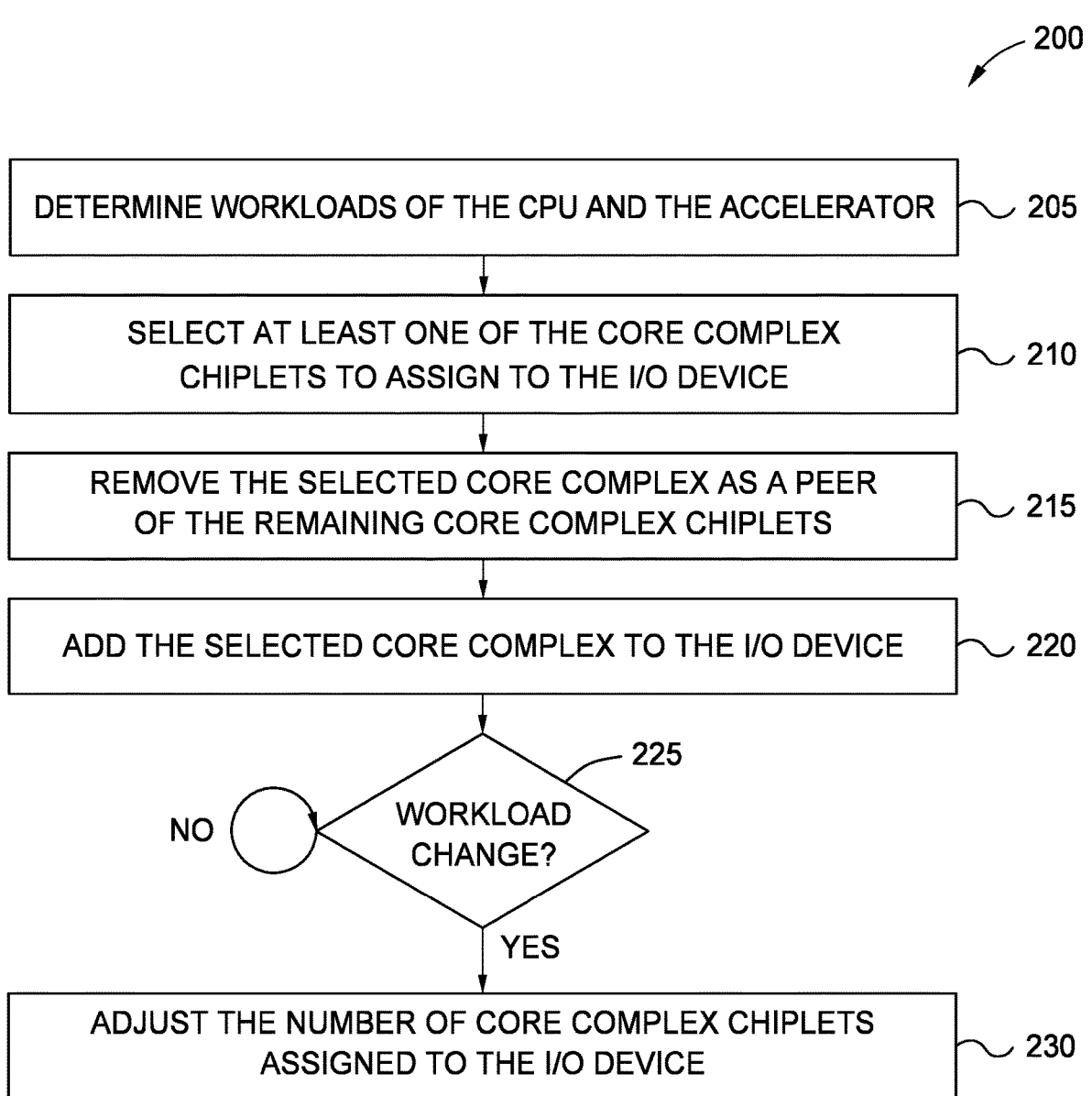
FIG. 2 is a flowchart for adding processing cores to the integrated accelerator, according to an embodiment.

FIG. 2 is a flowchart of a method 200 for adding processing cores to the integrated accelerator, according to an embodiment. At block 205, the workloads of the CPU and the accelerator are determined. This determination may be performed by a user application executed on the host, a system administrator, or the processor system. For example, the composable agent may rely on historical data to determine the workloads of the CPU and the accelerator. Or the composable agent may determine what type of user applications are, or will be, executed on the host which then can be used to estimate the workloads of the CPU and the accelerator when executing those applications. Alternatively, a silicon manufacturer may create a different set of products, each with a different mix of processor cores as part of the I/O device 130, and a static configuration of the composable agent 125, with those different set of products each targeting different workloads with different compute resources for the CPU 140.

For example, a control plane heavy workload such as a disaggregated storage workload can use significantly higher processing when compared to a data plane heavy workload, where the accelerator performs the bulk of the computation, and the processor cores in the CPU are lightly loaded. By determining (or estimating) the workloads on the CPU and the accelerator, the composable agent can determine how much compute resources each will need.

At block 210, the composable agent selects at least one of the core complex chiplets to assign to the IO device. That is, the composable agent selects at least one core complex chiplet to add to the accelerator chiplet to form the IO device. The number of core complex chiplets to assign to the IO device can depend on the workload for the IO device. For heavier workloads, additional core complex chiplets can be assigned to the IO device. For lighter loads, fewer (or no) core complex chiplets are assigned to the IO device.

At block 215, the composable agent removes the selected core complex chiplet as a peer of the remaining core complex chiplets. For example, the agent may deactivate connections between the selected core complex chiplets and the chiplets used to form the CPU. These connections may be cache-coherent connections and inter-processor interrupt connections between the selected core complex chiplets.

Further, the hardware in the selected core complex chiplet may be reconfigured so it behaves as a processor core in an IO device rather than a peer processor in the CPU. For example, the selected core complex chiplet may issue read and write memory requests to an IO memory management unit (MMU) in the interconnect. Further, the selected core complex chiplet may use message signaled interrupts (MSI) to signal an interrupt to the host processing system (e.g., the interconnect) even though the selected core complex chiplet is physically part of the host processing system. The MSI may be generated by the core complex, or the interconnect may translate the core complex interrupt into a MSI to the host processing system. However, the MSI is just one example of a suitable IO interrupt protocol that can be used.

At block 220, the composable agent adds the selected core complex chiplet to the IO device. For example, the interconnect may establish communication paths between the selected core complex chiplet and the accelerator chiplet such that the core complex chiplet functions like a processor subsystem that is integrated into the accelerator. With the established communication paths, the core complex chiplet may run an operating system independent from the operating system running on the CPU. The operating system's resources may now include the accelerator chiplet using the established communication paths between the selected core complex chiplet and the accelerator chiplet.

At block 225, the method 400 determines whether the workload has changed. This could be the workload of the CPU or the workload on the IO device. For example, the workload on the CPU may have increased such that the composable agent determines to move a core complex chiplet previously assigned to the IO device to the CPU. Or the workload on the IO device may have increased such that the composable agent moves a core complex chiplet previously assigned to the CPU to the IO device.

At block 230, the composable agent adjusts the number of core complex chiplets assigned to the IO device. This can include adding more core complex chiplets to the IO device, or removing a core complex chiplet from the IO device. This adjustment of the core complex chiplets can occur when rebooting the computing system, or it may be possible to adjust the number of core complex chiplets assigned to the IO device without having to reboot the computing system.

Figure 3:
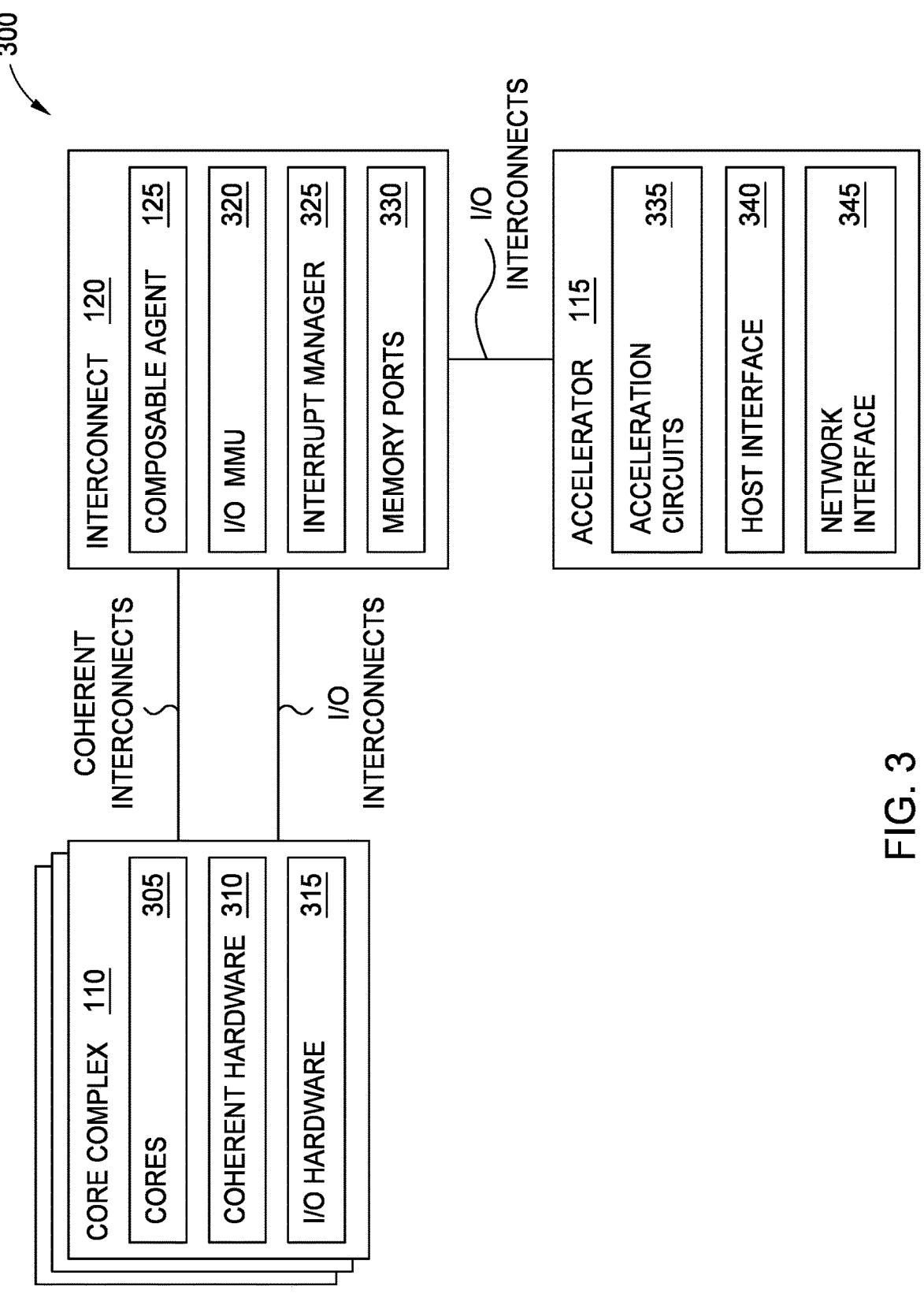
FIG. 3 is a block diagram of a processor system, according to an embodiment.

FIG. 3 is a block diagram of a processor system 300, according to an embodiment. Like the processor system 100, the processor system 300 includes core complex chiplets 110, the interconnect 120, and the accelerator chiplet 115. In this example, the core complex chiplets 110 have both coherent interconnects and IO interconnects to the interconnect 120. In one embodiment, the coherent interconnects are used when the core complex chiplets 110 are part of the CPU but the IO interconnects are used when the core complex chiplets 110 are part of the IO device.

The core complex chiplets 110 includes processing cores 305, coherent hardware 310, and IO hardware 315. The coherent hardware 310 includes circuitry or firmware that is used when the core complex chiplet 110 is a peer in the CPU while the IO hardware 315 includes circuitry or firmware used when the core complex chiplet 110 is part of the IO device. For example, when part of the CPU, the coherent hardware 310 may perform memory read and write requests as a cache coherent peer to the other core complex chiplets 110 forming the CPU. However, when part of the IO domain, the IO hardware 315 submits requests to read and write data to an IO MMU 320 in the interconnect 120, similar to the accelerator chiplet 115 and other IO devices. Moreover, rather than maintaining page tables with the other core complex chiplets 110 forming the CPU, the core complex chiplets 110 may receive page table translations from the IO MMU 320 when part of the IO device, and accessing CPU Memory. The composable agent 125 may assign at least one of memory ports 330 as IO domain memory. When part of the IO domain, the core complex chiplets 110 may run an operating system independent from the operating system running on the CPU, and maintain its own page tables mapped to IO domain memory. Further, the IO hardware 315 may support IO device interrupt semantics (e.g., MSI) that are subordinate to the interrupts used by the coherent hardware 310. The interrupt semantics may send interrupts to an interrupt manager 325 in the interconnect 120 that handles the interrupts received from chiplets in the IO device.

The interconnect 120 includes the composable agent 125, the IO MMU 320, and the interrupt manager 325, and memory ports 330. As discussed above, the composable agent 125 selects and assigns the core complex chiplets 110 to the CPU or the IO device. Moreover, the composable agent 125 can inform the IO MMU 320, interrupt manager 325, and the memory ports 330 which one of the core complex chiplets 110 are part of the CPU and which are part of the IO device. These circuits can then use the appropriate techniques to transmit data and handle interrupts.

In one embodiment, the interconnect 120 can include programmable logic to manage the transition of the core complex chiplets 110 between the coherent and IO interconnects (or pathways), the transition between homogeneous core interrupts and IO device semantic interrupts (e.g., MSI), and the transition between homogeneous core MMU and IO device semantics IO translation lookaside buffering (IOTLB) performed by the IO MMU 320. For example, the programmable logic can implement a bridge between the Core Interrupt Semantics used when the core complex chiplets 110 are part of the CPU and the IO message interrupt semantics used with the core complex chiplets 110 are part of the IO device. The programmable logic can also include a bridge for converting between a core page table walk used when the core complex chiplets 110 are part of the CPU and, e.g., IO PCIe address translation service (ATS) used when the core complex chiplets 110 are part of the IO device. This bridge can translate core page table accesses into PCIe ATS messages, and then the data structure received in the ATS response is modified to appear as a native-to-core instruction set architecture (ISA) page table.

The accelerator chiplet 115 includes acceleration circuits 335, a host interface 340, and a network interface 345. The acceleration circuits 335 can include acceleration engines (e.g., data processing engines, crypto engines, compression engines, AI engines, etc.), programmable logic, or combinations thereof. The acceleration circuits 335 can be any circuit that performs acceleration tasks assigned by the host (e.g., the CPU). For example, the core complex chiplets 110 forming the CPU (or the software executed on the chiplets 110) can offload acceleration tasks to the accelerator chiplet 115 using the interconnect 120.

The host interface 340 enables the accelerator chiplet 115 to communicate with the interconnect 120 via the IO interconnects. The host interface 340 can use a PCIe or Universal Interconnect Express (UCIe) connection to communicate with the interconnect 120. The host interface 340 may use a cache coherent protocol to communicate with the interconnect 120 and the core complex chiplets 110 assigned to the CPU, such as Compute Express Link (CXL™) or Cache Coherent Interconnect for Accelerators (CCIX®). While these protocols enable the accelerator 120 and any core complex chiplets 110 that are assigned to the IO device to be cache coherent with the core complex chiplets 110 forming the CPU, they are nonetheless subordinate to those core complex chiplets 110.

The network interface 345 enables the accelerator chiplet 115 to communicate with a network (e.g., a local area network (LAN) or a wide area network (WAN)). In this example, the accelerator chiplet 115 may be a DPU or a Database Accelerator. However, in embodiments where the accelerator is an AI or crypto accelerator that does not communicate with a network, the network interface 345 may be omitted.

Figure 4:
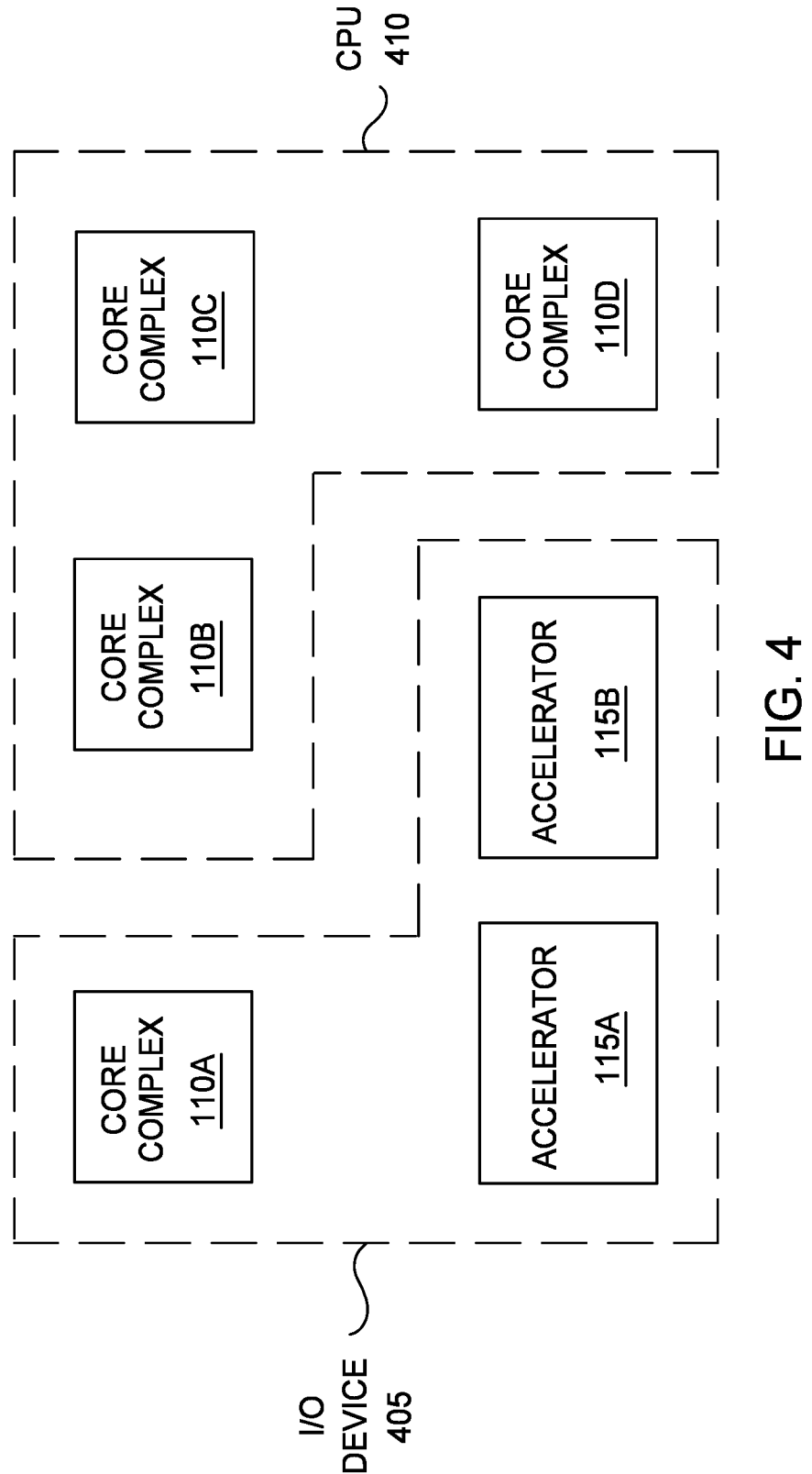
FIG. 4 illustrates a processor system that includes an integrated, adaptive accelerator, according to an embodiment.

FIG. 4 illustrates a processor system that includes an integrated, adaptive accelerator, according to an embodiment. For simplicity, the processor system in FIG. 4 only illustrates the core complex chiplets 110 and the accelerator chiplets 115, but does not illustrate the interconnect, which may also be present.

In this example, the processor system includes two accelerator chiplets 115A and 115B. In one embodiment, the accelerator chiplets 115 are the same type of accelerators (e.g., two DPU chiplets or two database accelerators). In one embodiment, the accelerator chiplets 115 may be the same integrated circuits. For example, the processor system may be designed to be used to execute an application that requires a particular accelerator task performed by the accelerator chiplets 115. Thus, the processor system may include two of the accelerator chiplets 115 rather than just one as shown in FIG. 1.

Like above, one or more of the core complex chiplets 110 can be assigned to the accelerator chiplets 115 to form the IO device 405. In this example, the core complex chiplet 110A is assigned to the accelerator chiplets 115A and 115B while the core complex chiplets 110B-D form the CPU 410 for the host. However, in other embodiments, more than one of the core complex chiplets 110 can be assigned to the IO device 405, or none of the core complex chiplets 110 are assigned to the IO device 405, in which case the accelerator tasks are performed solely by the accelerator chiplets 115A and 115B.

Figure 5:
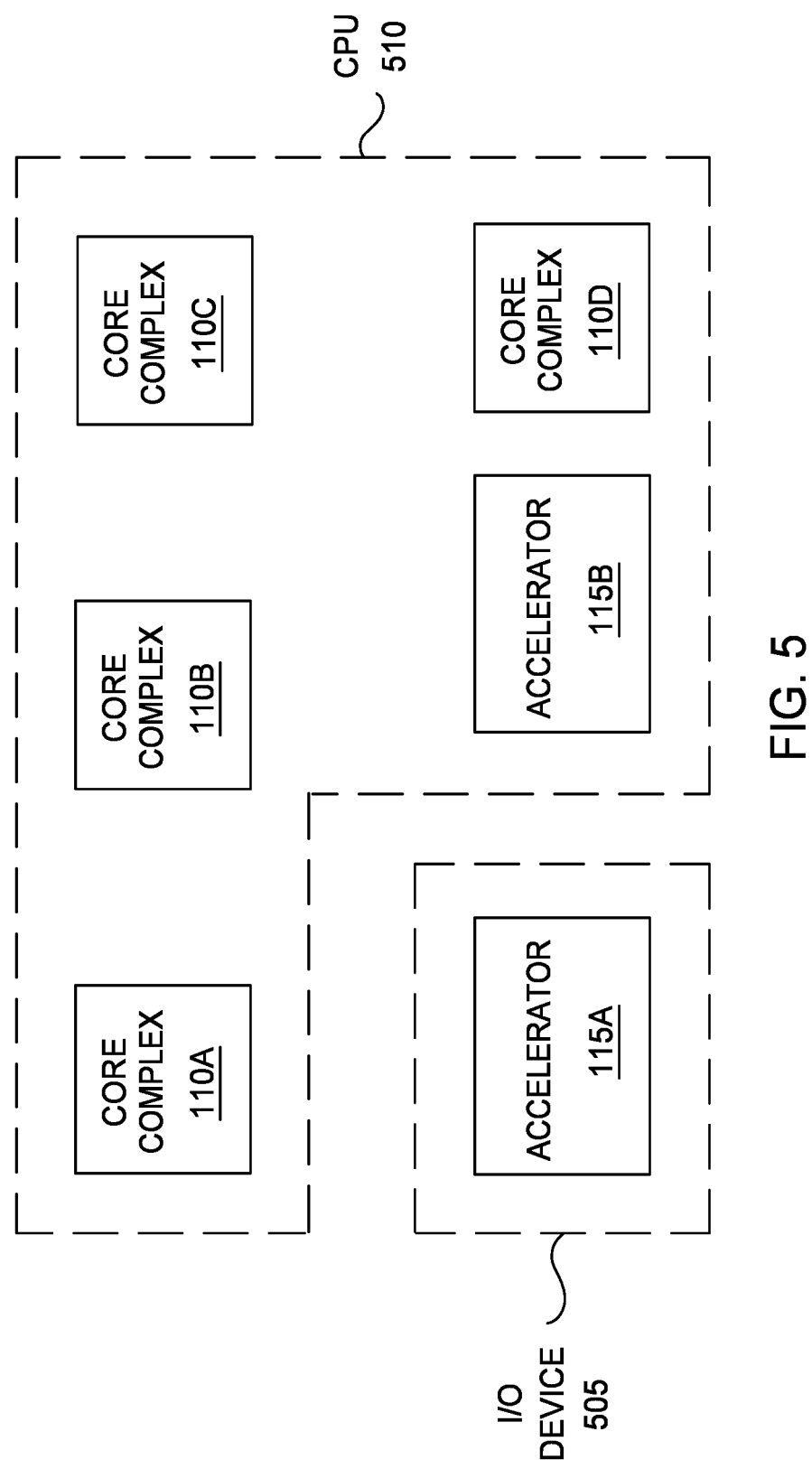
FIG. 5 illustrates a processor system that includes an integrated, adaptive accelerator, according to an embodiment.

FIG. 5 illustrates a processor system that includes an integrated, adaptive accelerator, according to an embodiment. For simplicity, the processor system in FIG. 5 only illustrates the core complex chiplets 110 and the accelerator chiplets 115, but does not illustrate the interconnect, which may also be present.

Like in FIG. 4, here, the processor system includes two accelerator chiplets 115A and 115B. In one embodiment, the accelerator chiplets 115 are the same type of accelerators (e.g., two DPU chiplets or two database accelerators). In one embodiment, the accelerator chiplets 115 may be the same integrated circuits. However, unlike in FIG. 4, FIG. 5 illustrates that one of the accelerator chiplets can be assigned to be part of the CPU 510. Thus, FIG. 5 illustrates that in addition to assigning the core complex chiplets 110 to the IO device 505, the accelerator chiplets 115 can be assigned to the CPU 510. For example, the current workload of the IO device 505 may be much less than the workload on the CPU 510. Thus, the composable agent can reassign the accelerator chiplet 115B to the CPU 510 while leaving the accelerator chiplet 115A to perform the functions of the IO device 505.

The accelerator chiplet 115B can serve as a peer processor to the other core complex chiplets 110 in the processor system. To do so, the accelerator chiplets 115 may also include coherent interconnects to the core complex chiplets 110 as well as hardware that supports the interrupt and memory management protocols used by the core complex chiplets 110 when part of the CPU 510.

Although not shown in FIG. 5, if the workloads for the IO device 505 and the CPU 510 change, the composable agent can then reassign the accelerator chiplet 115B to the IO device 505. Thus, FIG. 5 illustrates that the accelerator chiplets 115 can be designed to support both coherent and IO modes of operation, like the core complex chiplets 110.

Figure 6:
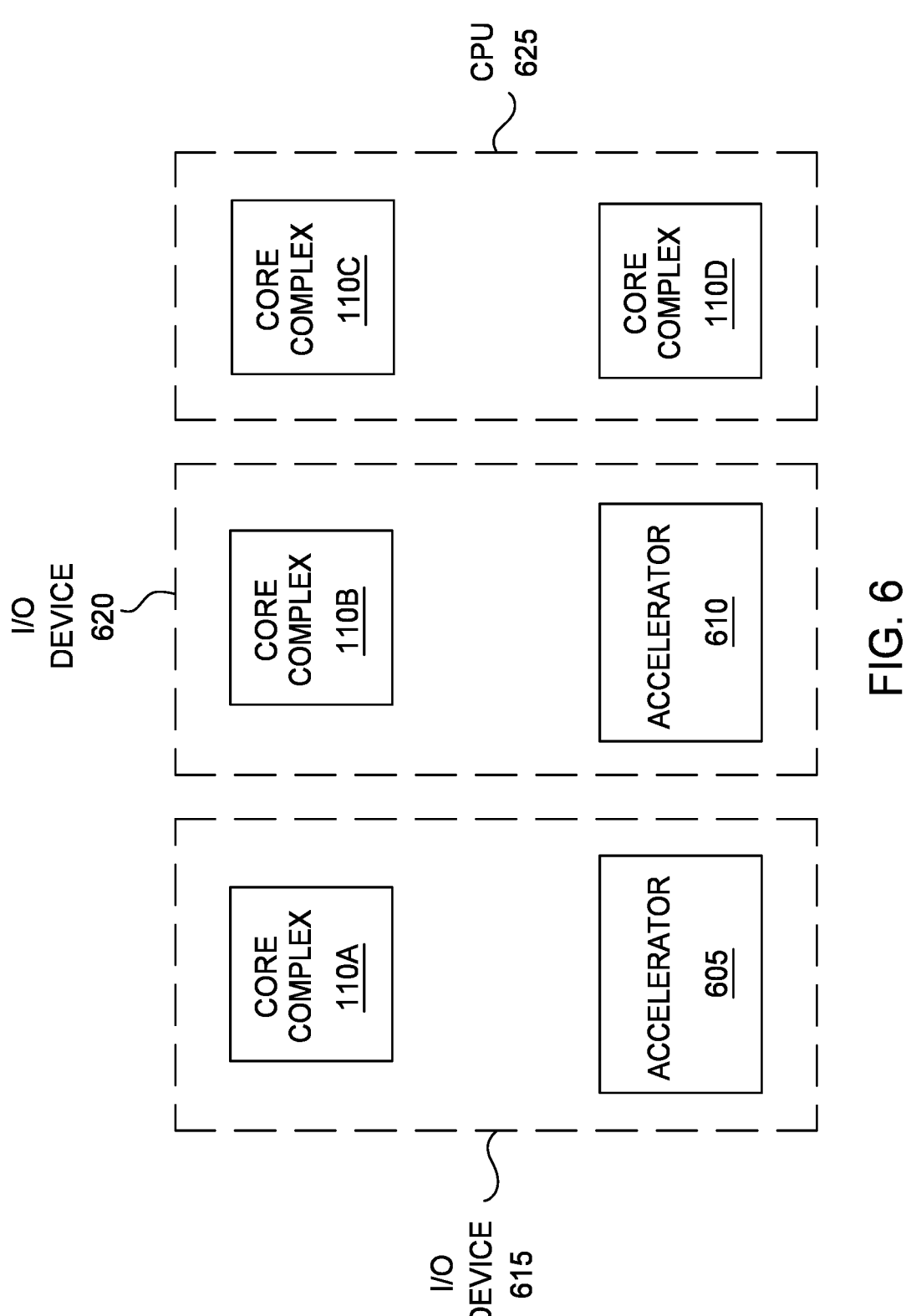
FIG. 6 illustrates a processor system that includes multiple integrated, adaptive accelerators, according to an embodiment.

FIG. 6 illustrates a processor system that includes multiple integrated, adaptive accelerators, according to an embodiment. For simplicity, the processor system in FIG. 6 only illustrates the core complex chiplets 110 and the accelerator chiplets 115, but does not illustrate the interconnect, which may also be present.

The processor system in FIG. 6 includes accelerator chiplet 605 and accelerator chiplet 610 which are different accelerators (i.e., the chiplets 605 and 610 are different). For example, the accelerator chiplet 605 may be a different type of accelerator than the accelerator chiplet 610. For instance, the accelerator chiplet 605 may be a DPU while the accelerator chiplet 610 is an AI accelerator. Thus, FIG. 6 illustrates that a processor system can include multiple different types of accelerator chiplets.

Further, the accelerator chiplets can be used to form different IO devices. In this example, the accelerator chiplet 605 and the core complex chiplet 110A form IO device 615 while the accelerator chiplet 610 and the core complex chiplet 110B form IO device 620. The remaining core complex chiplets 110 form the CPU 625 for the host. The composable agent can assign the core complex chiplets 110 in response to the individual workloads of the IO devices. For example, if the IO device 615 has (or is expected to have) a larger workload than the IO device 620, then the composable agent may assign two of the core complex chiplets 110 to the IO device 620. Thus, FIG. 6 illustrates that a processor system can include any number of different types of accelerators to support any number of different types of IO devices. Further, these IO devices can also include any number of the core complex chiplets 110 depending on their workloads.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A processor system in a host, comprising:
a substrate;
a plurality of core complex chiplets each comprising at least one processor core;
an accelerator chiplet; and
a composable agent configured to assign at least one of the plurality of core complex chiplets to the accelerator chiplet to form an IO device while the remaining plurality of core complex chiplets form a central processing unit (CPU) for the host, wherein the composable agent is further configured to sever coherent connections between the at least one of the plurality of core complex chiplets and the remaining plurality of core complex chiplets.

2. The processor system of claim 1, wherein the plurality of core complex chiplets are duplicate integrated circuits, wherein the accelerator chiplet is implemented using an integrated circuit that is different from the duplicate integrated circuits.

3. The processor system of claim 2, wherein the accelerator chiplet does not include any processor cores.

4. The processor system of claim 3, wherein the accelerator chiplet, in combination with the at least one of the plurality of core complex chiplets, forms a data processing unit (DPU).

5. The processor system of claim 1, further comprising:
an interconnect disposed on the substrate and implemented using an integrated circuit separate from the plurality of core complex chiplets and the accelerator chiplet, wherein the interconnect is configured to permit each of the plurality of core complex chiplets to communicate with each other and for the plurality of core complex chiplets to communicate with the accelerator chiplet.

6. The processor system of claim 5, wherein the interconnect includes first circuitry that supports interrupt semantics used by the plurality of core complex chiplets forming the CPU and interrupt semantics used by the at least one of the plurality of core complex chiplets assigned to the IO device, and second circuitry that supports memory accesses used by the plurality of core complex chiplets forming the CPU and memory accesses used by the at least one of the plurality of core complex chiplets assigned to the IO device.

7. The processor system of claim 1, further comprising:
an interconnect configured to permit each of the plurality of core complex chiplets to communicate with each other and for the plurality of core complex chiplets to communicate with the accelerator chiplet, wherein the interconnect and the accelerator chiplet are part of a same integrated circuit.

8. The processor system of claim 1, wherein, after assigning the at least one of the plurality of core complex chiplets to the accelerator chiplet, the composable agent is configured to reassign the at least one of the plurality of core complex chiplets to the CPU such that the at least one of the plurality of core complex chiplets is no longer part of the IO device.

9. The processor system of claim 1, wherein the composable agent is configured to assign an additional one of the plurality of core complex chiplets to the IO device such that IO device includes multiple ones of the plurality of core complex chiplets.

10. A processor system, comprising:
a plurality of core complex chiplets each comprising at least one processor core;
an accelerator chiplet; and
an interconnect connecting the plurality of core complex chiplets to each other and to the accelerator chiplet, the interconnect comprising:
a composable agent configured to assign at least one of the plurality of core complex chiplets to the accelerator chiplet to form an IO device while the remaining plurality of core complex chiplets form a central processing unit (CPU) for a host, wherein the composable agent is further configured to sever coherent connections between the at least one of the plurality of core complex chiplets and the remaining plurality of core complex chiplets.

11. The processor system of claim 10, wherein the plurality of core complex chiplets are duplicate integrated circuits, wherein the accelerator chiplet is implemented using an integrated circuit that is different from the duplicate integrated circuits, and wherein the interconnect is implemented using an integrated circuit separate from plurality of core complex chiplets.

12. The processor system of claim 10, wherein the accelerator chiplet does not include any processor cores.

13. The processor system of claim 10, wherein the interconnect includes first circuitry that supports interrupt semantics used by the plurality of core complex chiplets forming the CPU and interrupt semantics used by the at least one of the plurality of core complex chiplets assigned to the IO device, and second circuitry that supports memory accesses used by the plurality of core complex chiplets forming the CPU and memory accesses used by the plurality of core complex chiplets assigned to the IO device.

14. A method, comprising:
selecting at least one of a plurality of core complex chiplets to assign to an IO device while the remaining ones of the plurality of core complex chiplets are assigned to a CPU of a host;
removing the selected core complex chiplet as a peer of the remaining ones of the plurality of core complex chiplets, including severing coherent connections between the selected core complex chiplet and the remaining ones of the plurality of core complex chiplets; and
adding the selected core complex chiplet to the IO device, wherein the plurality of core complex chiplets are disposed on a same substrate as an accelerator chiplet also assigned to the IO device.

15. The method of claim 14, wherein the plurality of core complex chiplets are duplicate integrated circuits, wherein the accelerator chiplet is implemented using an integrated circuit that is different from the duplicate integrated circuits.

16. The method of claim 14, wherein each of the plurality of core complex chiplets contains at least one processor core, wherein the accelerator chiplet does not include any processor cores.

17. The method of claim 14, wherein the accelerator chip, in combination with the at least one of the plurality of core complex chiplets, forms a DPU.

18. The method of claim 14, wherein an interconnect is disposed on the substrate and implemented using an integrated circuit separate from the plurality of core complex chiplets and the accelerator chiplet.

19. The method of claim 14, further comprising:
determining workloads of the CPU and the IO device, wherein the workloads determine a number of the plurality of core complex chiplets to assign to the IO device and the CPU.

20. The method of claim 19, further comprising:
determining the workloads of at least one of the CPU and the IO device has changed; and
adjusting the number of the plurality of core complex chiplets assigned to the IO device.

* * * * *